July 21, 1970 W. W. JUTZI 3,521,180

ACTIVE TRANSMISSION LINE DEVICE

Filed March 1, 1968 4 Sheets-Sheet 1

INVENTOR
WILHELM W. JUTZI

BY Bernard N. Wiener

ATTORNEY

ACTIVE TRANSMISSION LINE DEVICE

United States Patent Office 3,521,180

Patented July 21, 1970

3,521,180
ACTIVE TRANSMISSION LINE DEVICE

Wilhelm W. Jutzi, Zurich, Switzerland, assignor to International Business Machines Corporation, Armonk, N.Y., a corporation of New York Filed Mar. 1, 1968, Ser. No. 709,624
Claims priority, application Switzerland, Mar. 3, 1967, 3,188/67
Int. Cl. H03f *3/60*
U.S. Cl. 330—31 12 Claims

ABSTRACT OF THE DISCLOSURE

An active transmission line device is disclosed in which elongated conductors serve as electrodes of an amplifying element; e.g., a semiconductor element. The electrodes are arranged so that the direction of current flow in the amplifying semiconductor element is essentially orthogonal to the conductors. The particular characteristics are achieved so that the characteristic behavior of at least one conductor with respect to at least one of its electric properties is unequally distributed over the length of the device.

In particular, the transconductance per unit length of the amplifier may vary along the active length of the device. In order to achieve a particular frequency response, in addition to the transconductance per unit length. the mutual coupling inductance per unit length or coupling capacity per unit length or both as well as the inductance per unit length or the capacity per unit length of the lines may be subject to variations. If the transconductance per unit length of the amplifying element approaches zero near the ends of the active length, it is also possible to use ohmic resistances as terminations without obtaining undue large reflections.

For use in a mode in which one wave type is amplified and another wave type is attenuated along the line, the active length of the conductors may be made sufficiently large so that the attenuated wave practically disappears. It is then possible to match optimally the signal output of the device for the amplified wave. The amplifying element of the device may be a field-effect transistor; e.g., with a Schottky-barrier, or a bipolar transistor. In both mentioned cases the semiconductor element may consist of a plurality of segments that are series-connected with respect to the signal. The characteristics of the transmission line may be influenced in each case by a material arranged in their field having permeable or dielectric properties or both, in particular the coupling inductance per unit length and the coupling capacitance per unit length of the conductors. Similar segments that are series-connected may be adjusted to different points of their amplifying characteristics, whereby an unequal distribution of the transconductance per unit length over the active length of the device results.

BACKGROUND OF THE INVENTION

The present invention relates generally to active devices, and it relates more particularly to an active transmission line device for signals containing frequencies in the order of magnitude of 10 or more gcps. ($10^9$ c.p.s.), which has a bandwidth suitable for short impulses and may have considerable amplification.

A "traveling wave transistor" is known in the prior art article in Proceedings IEEE, November 1965, page 1747, which is a particular embodiment of a field-effect transistor. The amplification achieved by this transistor, particularly at high frequencies, is not very large even at modest bandwidth requirements. Several fields of modern technology have a considerable interest in simple and cheap amplifiers for the above referred-to frequency ranges.

SUMMARY OF THE INVENTION

An object of this invention is to provide a device which has high amplification at a bandwidth hitherto not feasible.

A further object of the invention is to provide a device of this kind that can be made simply and at low cost.

A still further object of the invention is to provide a device having input and output lines suitable for impedance matching, e.g., by purely ohmic terminations.

The mentioned objects of the invention are achieved by an active transmission line device in which elongated conductors serve as electrodes of an amplifying element, e.g., a semiconductor element. The electrodes are so arranged that the direction of current flow in the amplifying semiconductor element is essentially orthogonal to the conductors. The particular characteristics, which will be explained later on, are achieved in which the characteristic behavior of at least one conductor, concerning at least one of its electric properties, is unequally distributed over the length of the device.

In particular, the transconductance per unit length of the amplifier may vary along the active length of the device. In order to achieve a particular frequency response, in addition to the transconductance per unit length, the mutual coupling inductance per unit length or coupling capacity per unit length or both as well as the inductance per unit length or the capacity per unit length of the lines may be subject to variations. If the transconductance per unit length of the amplifying element approaches zero near the ends of the active length, it is also possible to use ohmic resistances as terminations without obtaining undue large reflections.

For use in a mode in which one wave type is amplified and another wave type is attenuated along the line, the active length of the conductors may be made sufficiently large so that the attenuated wave practically disappears. It is then possible to match optimally the signal output of the device for the amplified wave. The amplifying element of the device may be a field-effect transistor, e.g., with a Schottky-barrier, or a bipolar transistor. In both mentioned cases the semiconductor element may consist of a plurality of segments that are series-connected with respect to the signal. The characteristics of the transmission line may be influenced in each case by a material arranged in their field having permeable or dielectric properties or both, in particular the coupling inductance per unit length and the coupling capacity per unit length of the conductors. Similar segments that are series-connected may be adjusted to different points of their amplifying characteristics, whereby an unequal distribution of the transconductances per unit length over the active length of the device results.

The foregoing and other objects, features and advantages of the invention will be apparent from the following more particular description of preferred embodiments of the invention, as illustrated in the accompanying drawings.

In the drawings:

FIG. 1 is a schematic view useful for explanation of the function of an active transmission line device according to this invention.

FIGS. 2*a* and 2*b* are a cross section and a longitudinal section of a preferred embodiment.

FIG. 3 is a cross section of a further embodiment.

FIGS. 4*a* and 4*b* are a cross section and a longitudinal section of another embodiment.

Figure 1:
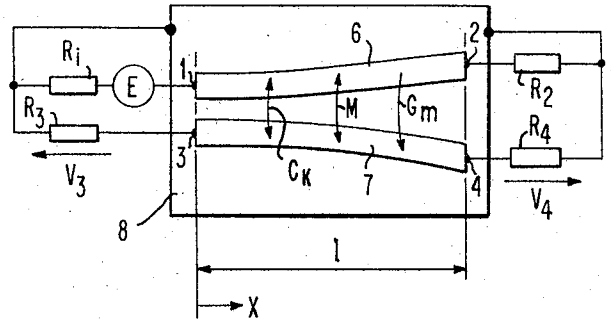

The following symbols and units of measure will be used in the description of the invention and in the drawing:

TABLE I

| Symbol | Unit | Description |
|---|---|---|
| S | | Source. |
| G | | Gate. |
| D | | Drain. |
| B | | Base. |
| E | | Emitter. |
| K | | Collector. |
| $C_K$ | F/mm | Coupling capacity per unit length. |
| M | H/mm | Coupling inductance per unit length. |
| $G_M$ | S/mm | Transconductance per unit length. |
| $t$ | S | Transconductance. |
| C | F/mm | Capacity per unit length. |
| L | H/mm | Inductance per unit length. |
| $k_C$ | | Capacitive coupling factor. |
| $k_L$ | | Inductive coupling factor. |
| R | Ω/mm | Resistance per unit length. |
| $R_{2...4}$ | Ω | Terminal impedance. |
| Z | Ω | Characteristic impedance. |
| E | V | Imput voltage. |
| $R_i$ | Ω | Internal Resistance. |
| V | V | Output voltage. |
| $\alpha$ | $mm.^{-1}$ | Attenuation constant. |
| $\beta$ | $mm.^{-1}$ | Phase constant. |
| $\lambda$ | $mm.^{-1}$ | Propagation constant. |
| $\omega$ | $sec.^{-1}$ | Cyclic frequency. |
| $f$ | $sec.^{-1}$ | Frequency. |
| A | | Amplification factor. |
| N, O, P, Q | | Constant factors. |
| $x$ | mm | Distance from input. |
| $\lambda$ | mm | Wave-length. |
| $l$ | mm | Active length of line. |
| $n$ | mm | Passive length of line. |

DESCRIPTION OF EMBODIMENTS OF THE INVENTION

The invention will now be explained by reference to exemplary embodiments.

FIG. 1 depicts a pair of lines 6 and 7 connected between pairs of terminal points 1 and 2 and 3 and 4, respectively, arranged above a conductive plate 8 which serves as ground-return. The mutual relation between the two lines 6 and 7 can be expressed by the coupling capacity per unit length $C_k$, the coupling inductance per unit length M, and the tranconductance per unit length $G_m$. Both lines are loaded with capacitances, not shown in the drawing, to the common ground plate 8. The curvature of lines 6 and 7, respectively, indicates that the coupling parameters per unit length are not constant along the lines, but subject to variation as will be described in greater detail hereinafter. The active length of the line is $l$. At point 1 a signal of volta E is applied across internal resistance $R_1$. Points 2, 3, and 4 are loaded with terminating impedances $R_2$, $R_3$, and $R_4$.

The coupling parameters per unit length $C_k$ and M are common to all transmission lines of an active transmission line device for practice of this invention. The coupling value $t=G_m \cdot l$ is the transconductance of an amplifier element whose electrodes are constituted by the above mentioned pairs of lines. In the embodiment illustrated FIGS. 2*a* and 2*b*, a field-effect transistor serves as amplifier element. The electrodes of this field-effect transistor are extended considerably in a direction orthogonal to the current flow in the semiconductor. Therefore, the electrodes constitute transmission lines having a particular transconductance per unit length. Accordingly, transmission lines are coupled by inductance, by capacitance, and by transconductance.

Figures 2A, 2B:
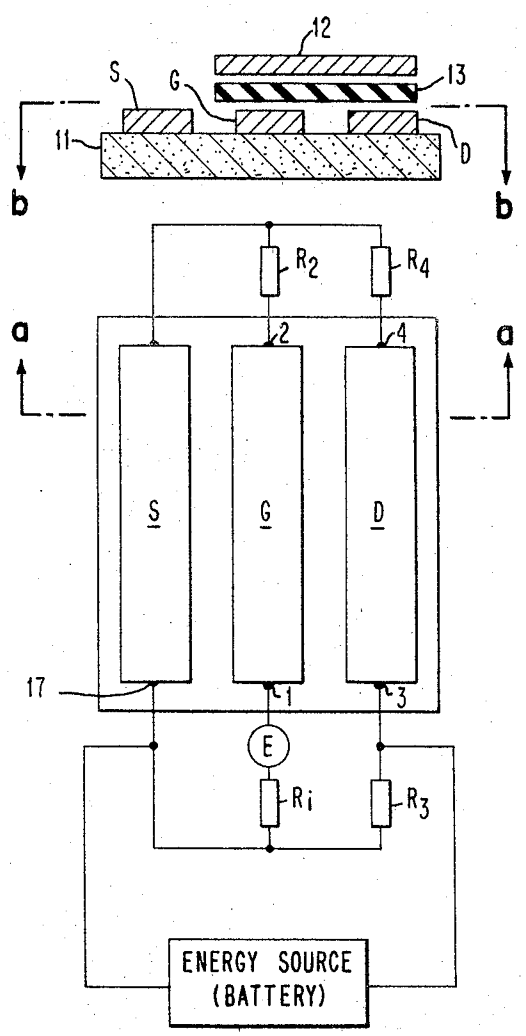

FIG. 2*a* depicts a cross section of the field-effect transistor. A source electrode S, a gate electrode G, and a drain electrode D are arranged on a semiconductor substrate 11. In FIG. 2*b* the transistor has a considerable extent in the direction vertical to the drawing plane. Electrodes G and D correspond to lines 6 and 7 of FIG. 1. An energy source, e.g., a battery, is shown in FIG. 2 connected between the lower terminal 17 of source S and terminal 3 of drain D. It will be understood that a comparable energy source is provided for each embodiment described hereinafter. The line which constitutes the source electrode S may extend over gate line G and drain line D as shown by conductive layer 12. Further, there is a layer 13 disposed between conductive layer 12 and electrodes G and D which may have dielectric or magnetic properties or both simultaneously. The layer 13 may influence the capacitive and inductive coupling as well as the capacitive load of the lines to ground. The properties of layer 13, semiconductor 11, and electrodes S, G, and D may be subject to variation along the length $l$, of the line as will be described in greater detail hereinafter. For clarity, the drawing is exaggerated; and it is obvious that in practice the different layers of an embodiment of the invention may be very thin. The transistor may be of the Schottky-barrier type.

Figure 3:
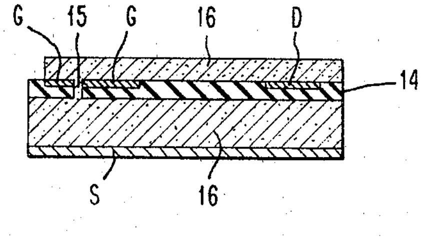

FIG. 3 illustrates a further embodiment of this invention. The semiconductor substrate 16, which also serves as source electrode S, extends through the small slotlike opening 15 of insulating layer 14 and the gate electrode G. Thereupon it enlarges to constitue the top layer 16 with which drain contact D is in contact. Again, gate as well as drain electrodes constitute elongated lines extending vertical to the drawing plane. An advantage of the embodiment of FIG. 3 results from the small slotlike opening 15 which is suitable for the depletion zone of the field-effect transistor. Alternatively, 15 may have the form of a row of holes. The properties of insulating layer 14 may influence the transmission line parameters. It is sometimes advantageous to use the device of the above described embodiment in a common gate connection. This will avoid the so-called "Miller-Effect" which causes a limitation of the frequency response toward high frequencies. However, this advantage is achieved by having a relatively low input resistance.

Figure 4A:
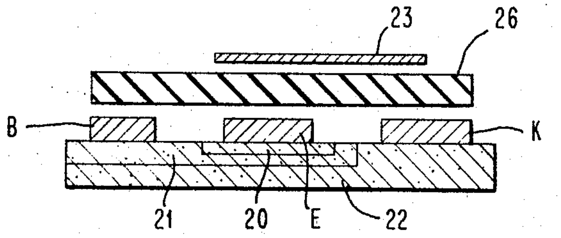
Figure 4B:
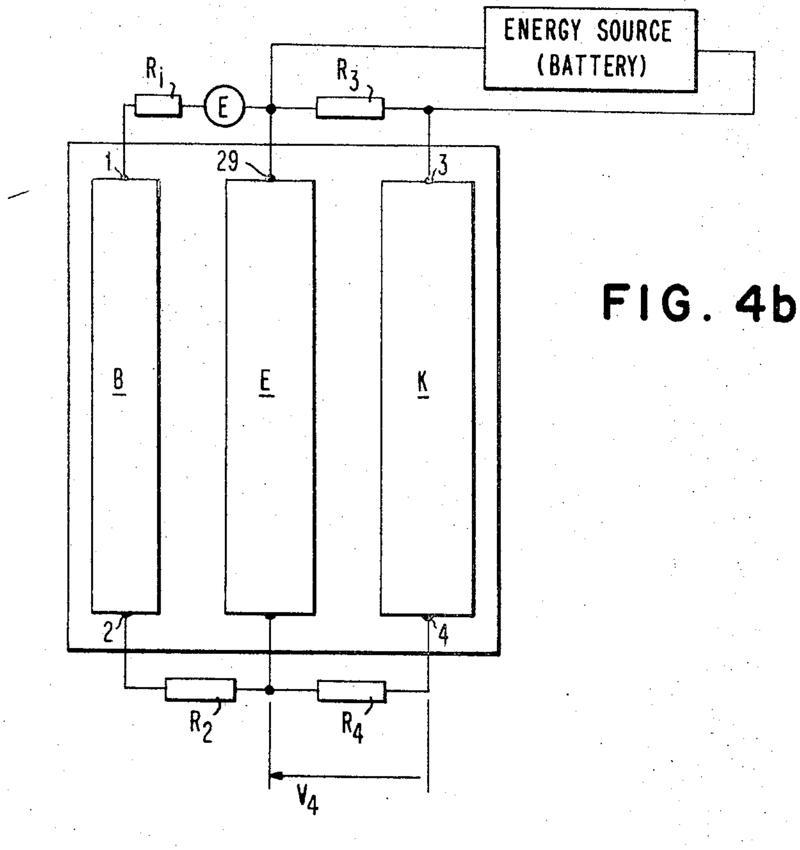

FIGS. 4*a* and 4*b* illustrate an active transmission line device using a bipolar transistor. In the semiconductor substrate 22, which is of one conductivity type, there is diffused a zone 21 of opposite conductivity type into which a second zone 20 of the first conductivity type is diffused. The sequence of the zones can be either P-N-P or N-P-N. The zone 20 is the emitter, the zone 21 is the base, and the zone 22 is the collector of the transistor. The base and collector contacts B and K constitute the lines which correspond to lines 6 and 7 of FIG. 1, and the emitter contact serves as common ground return. As shown in FIG. 4*b*, the transistor is extended orthogonal to the direction of current flow. An energy source, e.g., a battery, is shown in FIG. 4*b* connected between contact 29 on the end of emitter E and contact 3 on the end of collector K. The layer 26 corresponds to the layer 13 of the first embodiment illustrated in FIGS. 2*a* and 2*b*, and its properties can influence the coupling of the lines. As with the conductive layer 12 in FIG. 2*a*, the coupling may also be influenced by a conductive layer 23 which extends over lines E and K. It is to be noted that with this embodiment, lines 6 and 7 (FIG. 1), which are electrodes of the transistor, are not arranged within the third electrode. This is an advantage in realizing integrated connections as well as with other applications.

The manner of operation of the invention will now be explained.

If a high frequency signal E is applied at point 1 in FIG. 1, there will be two pairs of waves on the transmission lines of the device. Each pair of waves will consist of one wave propagating in the forward direction and one wave propagating in the backward direction. If the capacitive coupling factor $k_C$ is larger than the inductive coupling factor $k_L$ and if ohmic losses in the lines are sufficiently small, the amplitude of one wave pair will increase in its direction of propagation while the amplitude of the other wave pair will be attenuated in its direction of propagation because the lines are coupled by the transconductance per unit length $G_m$. If ohmic losses and coupling inductance are neglected and if it is assumed that inductance and capacitance of both lines are equal, e.g., $L_1=L_2=L$ and $C_1=C_2=C$, then the following equations represent the propagation constant $\gamma$:

$$\gamma_1=\omega\cdot\sqrt{L(C+C_k)}\cdot\sqrt{-1+k_C\sqrt{1+j\frac{G_m}{\omega C_k}}} \quad (1)$$

$$\gamma_3=\omega\cdot\sqrt{L(C+C_k)}\cdot\sqrt{-1+k_C\sqrt{1+j\frac{G_m}{\omega C_k}}} \quad (2)$$

For high frequencies, if $G_m/\omega C_k<<1$, the following limiting values may be deduced from the above equations:

$$\gamma_{1\infty}=\frac{1}{4}G_m\cdot Z_{11\infty}+j\omega\sqrt{L\cdot C}=\alpha_{1\infty}+j\beta_{1\infty} \quad (3)$$

$$\gamma_{3\infty}=-\frac{1}{4}G_m\cdot Z_{13\infty}+j\omega\sqrt{L\cdot(C+2C_k)}=\alpha_{3\infty}+j\beta_{3\infty} \quad (4)$$

$Z_{11\infty}$ and $Z_{13\infty}$ are the limiting values for high frequency of the characteristic impedances:

$$Z_{11\infty}=\frac{jL}{\gamma_1}\text{ and }Z_{13\infty}=\frac{jL}{\gamma_3}$$

Figure 5:
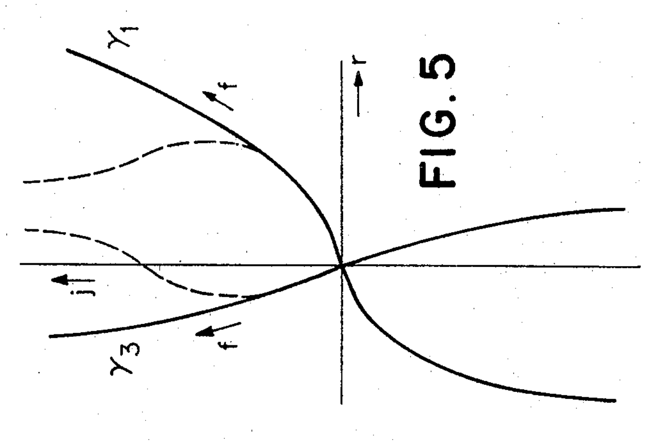
FIG. 5 is a graph of the locus of the complex propagation constants for a processed signal.

The locus of $\gamma_1$ and $\gamma_3$ in the complex plain is illustrated in FIG. 5. The real part $r$ is measured on the abscissa, and the imaginary part $j$ is measured on the ordinate. The graph is valid for a loss-free device and for the case $M=0$. The dashed curves illustrate the fact that the transconductance per unit length becomes complex and that its value decreases due to transit effect at higher frequencies. The graph serves to determine the voltages $V_1$ and $V_2$ at any point $x$ along the lines 6 and 7 between points 1 and 2 and 3 and 4, respectively, as:

$$V_1=N_1\cdot e^{-\gamma_1 x}+O_1\cdot e^{-\gamma_2 x}+P_1\cdot e^{-\gamma_3 x}+Q_1\cdot e^{-\gamma_4 x}$$

$$V_2=N_2\cdot e^{-\gamma_1 x}+O_2\cdot e^{-\gamma_2 x}+P_2\cdot e^{-\gamma_3 x}+Q_2\cdot e^{-\gamma_4 x}$$

Therefore, $$\gamma_1=-\gamma_2\text{ and }\gamma_3=-\gamma_4$$

The values of the frequency dependent factors N, O, P, and Q can be determined by aid of the applicable differential equations and the values of the voltages and currents at the outputs of the active transmission line device.

If the resistance per unit length R of the transmission line has a certain finite value, the limit values of the attenuation constants are modified as follows:

$$\alpha_{1\infty}=\frac{1}{4}\cdot G_m\cdot Z_{11}+\frac{1}{2}\cdot\frac{R}{Z_{11\infty}} \quad (5)$$

$$\alpha_{3\infty}=-\frac{1}{4}\cdot G_m\cdot Z_{13}+\frac{1}{2}\cdot\frac{R}{Z_{13\infty}} \quad (6)$$

It is noted that for $$Z_{13\infty}>\sqrt{\frac{2R}{G_m}}$$

the value $\alpha_{3\infty}$ remains negative. However, in a purely passive device in which the transconductance $G_m=0$, the attentuation $\alpha_{3\infty}$ would always be positive.

At high frequencies and relatively small line length $l$, i.e., if $\alpha_{3\infty}\cdot l<<1$, the effects of both wave pairs have to be considered. At low frequencies, the amplification $A_{s0}$ is approximated as:

$$A_{s0}=\frac{R_i}{R_i+R_2}\cdot G_m\cdot l\cdot\frac{R_3\cdot R_4}{R_3+R_4} \quad (7)$$

Figures 6, 7:
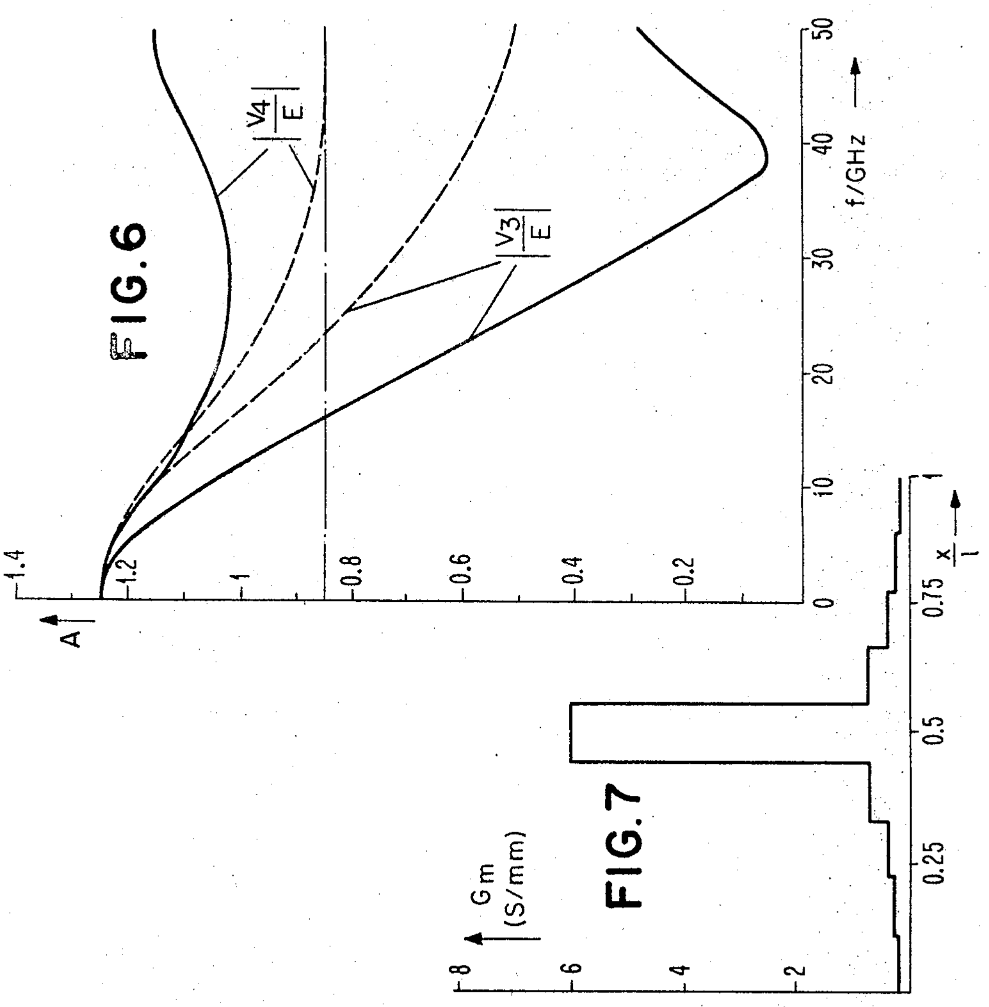
FIG. 6 is a graph of the frequency response of the absolute value of amplification for two distinct cases.
FIG. 7 is a graph of the transconductance per unit length of a particular embodiment.

At higher frequencies, the reflections for the four waves at the four terminals $R_i$, $R_2$, $R_3$, and $R_4$ have to be taken into account. As each line has two characteristic impedances, $Z_{11}$ and $Z_{13}$, an ideal matching for all waves is impossible. However, for real terminations $$R_i=R_2=R_3=R_4=\sqrt{L/(C+C_k)}$$

reasonable reflections are obtained. The frequency dependence of the absolute value of amplification is illustrated in FIG. 6. The solid lines of this figure are calculated for the following parameters of Table II:

TABLE II $L_1=L_2=0.5$ nh./mm.;
$C_1=C_2=0.15$ pf./mm.;
$R=0$;
$C_k=0.05$ pf./mm.;
$M=0$;
$G_m=0.1$ s./mm.;
$l=1$ mm.;
$R_i=R_2=R_3=R_4=45\Omega$ (8)

It is apparent in FIG. 6 that the signal at output point 3 decreases far more toward higher frequencies than the signal at output point 4 and reaches the 3 db limit (dash-dotted line) at a frequency of about 14 gcps. (gigacycles per second). The frequency dependence of the signal at output point 3 may be considerably improved without notably changing the frequency dependence of the signal at output point 4 by distributing the reflections in a suitable manner along the line and thereby making them smaller at each individual point. These reflections according to the previous discussion appeared only at the line ends and were of considerable amount. The complex characteristic imepdances $Z_{11}$ and $Z_{13}$ are modified along the lines. Such modifications can be achieved by modification of one or more parameters of the lines, like L, C, $C_k$, M, and $G_m$, which cause an unequal distribution of the coupling.

Illustratively, the parameter of transconductance $G_m$ may be varied so that its average value remains constant; but the transconductance per unit length along the line varies. This is the case if, as is illustrated in FIG. 7, the transconductance per unit length of the transistor varies as a function of the distance $x$ from the line end. If the illustrated function is integrated over the length $l$, it is apparent that the average transconductance of the transistor is 0.1 s./mm. This means that the parameter of the entire transistor has the value indicated above. At the near end 3 of the line, the limiting freqeuncy $f_g$ is extended by a factor 1.5 due to this measure so that $f_g$ now is about 22 gcps., as the lower dashed line in FIG. 6 indicates. The upper dashed line in FIG. 6 shows that the amplification at the far end 4 decreases only for 3 db in the illustrated frequency range.

As noted above, two wave pairs exist on the lines, each of which contains one wave which is attenuated and one wave which is amplified. If the length $l$ of the amplifier element, i.e., of the lines 6 and 7 is sufficiently large so that:

$$e^{-\alpha_{1\infty}l}<<1\text{ and }e^{-\alpha_{3\infty}l}>>1$$

then one wave of each pair is completely attenuated; and consequently reflections will not be generated at line ends 2 and 4. Under this condition, the terminating impedances or the characteristic impedances can be dimensioned by choice of line parameters in such a way that an ideal matching will result for the amplified wave, i.e., $$R_3=R_4=Z_{13}$$

Under these conditions, the amplified wave will not generate any reflections. The ratio of voltages at points 3 and 4 will now be very large. In the extreme case if $\alpha_3=\alpha_{3\infty}$ and if all terminations are ideally matched, the amplification will be:

$$\left|\frac{V_{21\,max.}}{L}\right|=A_{s\,max.}=-\frac{1}{4}e^{-\alpha_{3\infty}l} \quad (9)$$

As is apparent from this formula, the amplification increases exponentially with the line length.

In an exemplary embodiment, a semiconductor amplifier shall be considered with an active length $l=20$ mm. over which lines 6 and 7 are coupled with the other parameters remaining as those given in Table II above. The computed amount of the amplification $A_s$ as a function of frequency is given as dashed line in FIG. 8. The graph shows that the amount of amplification at 10 gcps. is about 100 and that the maximum amplification according to Equation 9 will be reached at still higher frequencies. The amplification illustrated by the dashed line cannot be realized in practice because of losses due to the ohmic resistance of the lines, as is apparent from Equations 5 and 6, respectively. Further, a transient effect in the semiconductor will be significant at high frequencies and will cause the transconductance to be complex and decreasing in amount, thus causing lower amplification. A decrease of the amount of transconductance by 3 db due to transient effects will approximately be obtained by a frequency:

$$f_t=\simeq\frac{3\cdot G^m}{(C+C_k)\cdot 2\pi}$$

Figure 8:
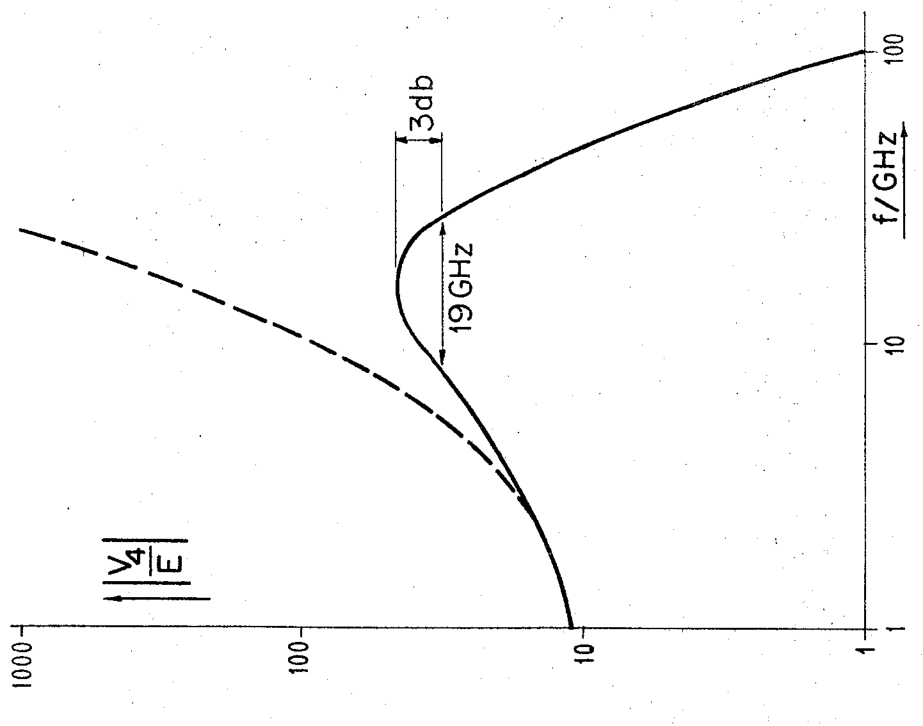
FIG. 8 is a graph of the frequency response of the absolute value of amplification for a particular embodiment.

For $f_t=30$ gcps., the amplification will reach a maximum $A_{s\,max}=45$, as the solid line in FIG. 8 illustrates. It is noted that the frequency response of amplification of a very long active device is band-pass type rather than low-pass type.

The bandwidth of the amplifier depends mainly upon the matching of the characteristic impedance $Z_{13}$. For high frequencies, $Z_{13}$ has a small but not negligible phase; and a good match can practically be realized only for a finite bandwidth. The unequal distribution of line parameters over the length $l$, particularly of the transconductance per unit length $G_m$, can be used to simplify the matching problem. If the transconductance per unit length approaches zero near to the connection points and if ohmic losses are neglected, the characteristic impedance there has the phase zero, i.e., the termination impedance becomes purely ohmic. The above considerations show why the theoretically possible value of the amplification cannot be obtained in a practical embodiment. The stability of the amplifier against self-oscillation is related to the matching problem. The unequal distribution of line parameters along the coupling length is very advantageous.

Figure 9:
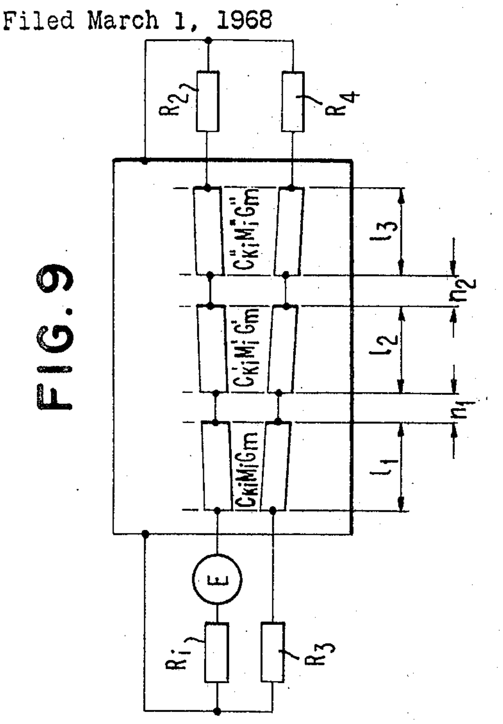
FIGS. 9 and 10 are schematic top views of further embodiments.

In the embodiment described above, the active length of the device was assumed to be $l=20$ mm. In practice it is difficult to make semiconductor elements so large. However, this difficulty can be overcome because it is not necessary that the whole amplifier consist of one individual element. It can consist of a number of structurally independent sections interconnected with each other by passive lines. These sections may be made by epitaxy, evaporation, mask-controlled diffusion, or another conventional procedure on a common semiconductor substrate. However, they may also be independent semiconductor bodies properly arranged and interconnected with passive lines. It is desirable in these cases that the passive connection lines be short in comparison with the signal wavelength and be matched with their characteristic impedance so that unfavorable reflections are not generated. Such an arrangement is illustrated in FIG. 9. The active line sections $l_1$, $l_2$, and $l_3$ taken together constitute the active line length $l$. They may be arranged on a common semiconductor substrate or on different and individual substrates. They are interconnected by passive line sections $n_1$ and $n_2$.

Figure 10:
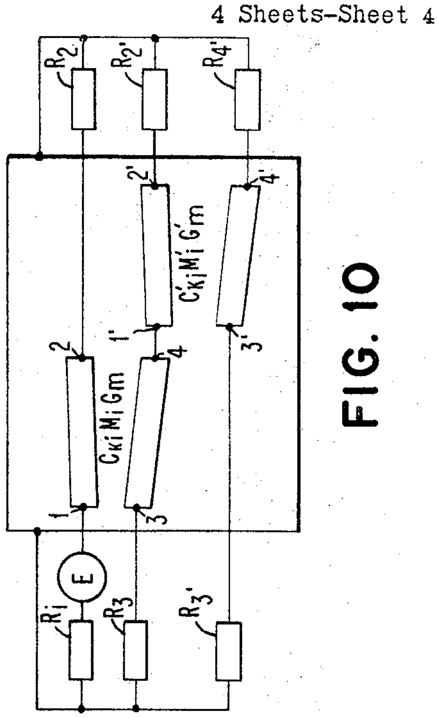

Another embodiment of this invention is illustrated in FIG. 10. The lines are not continuous but interrupted.

This embodiment can also be considered as two series-connected amplifiers. Because of the coupling between line sections 6 and 7 and between line sections 6' and 7', the operation is very similar to the operation of the arrangement shown in FIG. 1. An advantage of the arrangement of FIG. 10 is that line 6 of the first stage may be broken which makes possible compact design. The termination resistances correspond to the characteristic impedances at the respective line points. With this arrangement, it may be advantageous to alter the impedances so that the optimum operational conditions are obtained. Illustratively, if $R_1=50\Omega$, it may be advantageous to provide for 100Ω at point 4 or point 1', and to have the line terminate with a characteristic impedance of 50Ω at 4'. It will be evident to one skilled in the art that the arrangement according to FIG. 9 as well as the arrangement according to FIG. 10 may consist of two, three, or more sections.

In an arrangement according to FIG. 9 or FIG. 10, an unequal distribution of the transconductance per unit length over the total length of the device $l=l_1+l_2+\ldots l_n$ can be achieved by adjusting the respective amplifier element in each section to a particular point of the working characteristic of the semiconductor. With a field-effect transistor, this can be achieved by adjustment of the respective gate-bias-voltage; with a bipolar transistor, it can be achieved by adjustment of the base-bias voltage.

An active transmission line device as described herein for the practice of this invention can be easily dimensioned according to the well known filter and transmission line theories to obtain a particular desired frequency response. Certain frequencies may, if desired, be raised; and other unwanted frequencies may be suppressed.

SUMMARY OF THE INVENTION

A summary of the invention will now be presented. Generally, the invention provides an amplifier device which comprises two transmission lines with respective electromagnetic wave propagation paths therein. There are both active and passive coupling means between the transmission lines with at least one of the coupling means being nonuniformly distributed along the lines. There is a medium disposed in the first transmission line along its transmission path for sustaining current flow between the conductors thereof which is essentially orthogonal to the propagation path. An electrical signal source is connected to the second transmission line for establishing both a wave and a distribution of voltage along it which determines a corresponding current distribution along the first transmission line to amplify the first wave.

The invention will now be summarized in greater detail with reference to FIGS. 1 and 2. The active transmission line device of this invention comprises two transmission lines with three elongated conductors, the first transmission has as the conductors identified as source S and drain D and the second transmission line has the conductor's source S and gate G. Each transmission line has a respective propagation path for a traveling electromagnetic wave pair therein. A semiconductor element 11 which is an active medium is disposed in the transmission line comprising the source electrode S and drain electrode D and forms a current path therebetween which is orthogonal to the direction of propagation of the traveling wave electromagnetic pair in the transmission line thereof. The transmission lines are coupled passively by inductance and capacitance and coupled actively by transconductance with at least one of the couplings being nonuniformly distributed along the transmission lines. An energy source for the current path is connected between the source electrode S and the drain electrode D. The voltage signal source E is connected to one and of the transmission line consisting of the gate electrode G and the source electrode S which establishes wave and a distribution of voltage along it which determines a corresponding current distribution along the transmission line consisting of the source electrode S and the drain electrode D.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An amplifier device comprising: first and second transmission lines having respective first and second electromagnetic wave propagation paths for first and second electromagnetic waves;

active coupling means and passive coupling means for actively and passively coupling respectively said first and second transmission lines with at least one of said coupling means being nonuniformly distributed along said transmission lines;

said active coupling means including a medium means disposed in said first transmission line along said first propagation path therein for sustaining current flow essentially orthogonal to said first propagation path; and electrical signal source means connected to said second transmission line for establishing said second electromagnetic wave therein, said second electromagnetic wave in turn providing a distribution of voltage along said second transmission line for creating a corresponding current distribution along said first transmission line to induce said first electromagnetic wave in said first transmission line as an amplified version of said second electromagnetic wave.

2. A device as set forth in claim 1 wherein said active coupling means between said first and second transmission lines includes transconductance per unit length between said first and second transmission lines which varies along the length of said transmission lines.

3. A device as set forth in claim 1 wherein said active coupling means includes transconductance per unit length and said passive coupling means includes at least one of the group consisting of inductive coupling per unit length and capacitive coupling per unit length between said transmission lines which varies along the length of said transmission lines to achieve a predetermined frequency response in said amplifier device.

4. A device as set forth in claim 1 wherein said active coupling means includes transconductance per unit length which varies along the length of said transmission lines, and at least one of the group consisting of the capacitance per unit length and the inductance per unit length of at least one of said transmission lines varies along the length thereof to vary the characteristic impedance thereof to achieve a particular frequency response.

5. A device as set forth in claim 2 wherein said active coupling means includes transconductance per unit length between said transmission lines which approaches zero near the ends thereof; and said transmission lines have respective ohmic matching termination impedances.

6. A device as set forth in claim 1 wherein said medium means includes a semiconductor field effect transistor.

7. A device as set forth in claim 1 wherein each of said transmission lines comprises the same plurality of individual sections which are series connected with respect to the respective wave therein.

8. A device as set forth in claim 7 in which each of said series connected sections of said transmission lines have equal transconductance per unit length over their respective lengths, and each said section is operated at different working points of their respective amplifier characteristics so that effectively a nonuniform distribution of the transconductance per unit length is achieved over an active length defined by said transmission lines of said device.

9. An active transmission line device comprising:

first, second, and third conductors;

a first transmission line defined by said first and second conductors for a first electromagnetic wave in a first propagation path in said device;

a second transmission line defined by said second and third conductors for a second electromagnetic wave in a second propagation path in said device;

active coupling means and passive coupling means for actively coupling and passively coupling respectively said first transmission line to said second transmission line with at least one of said coupling means being nonuniformly distributed along said transmission lines;

said active coupling means including an active medium means disposed in said first transmission line and forming a current path between said first conductor and said second conductor, said current path being approximately orthogonal to said first propagation path for said first wave;

an energy source for said current path connected between said first conductor and said second conductor; and a voltage signal source connected to said second transmission line at one end thereof for establishing said second wave, said second wave providing a distribution of voltage along said second transmission line for creating a corresponding current distribution along said first transmission line to induce said first electromagnetic wave in said first transmission line as an amplified version of said second electromagnetic wave.

10. A device as set forth in claim 1 wherein each of said transmission lines comprises the same plurality of individual sections which are stage connected, the output transmission line of one section being connected to the input transmission line of the next section which are series connected with respect to the respective wave therein.

11. A device as set forth in claim 4 wherein at least one of said group consisting of said capacitance per unit length and said inductance per unit length is varied uniformly along said one of said transmission lines.

12. A device as set forth in claim 4 wherein at least one of said group consisting of said capacitance per unit length and said inductance per unit length is varied nonuniformly along said one of said transmission lines.

References Cited

UNITED STATES PATENTS

| | | | |
|---|---|---|---|
| 2,757,343 | 7/1956 | Eland | 333—34 |
| 3,378,738 | 4/1968 | McIver | 317—235 |

OTHER REFERENCES

S. B. Cohn: Proc. of I.R.E., "Directional-Separation Filters," pp. 1018–1024, August 1956.

JOHN KOMINSKI, Primary Examiner

U.S. Cl. X.R.

317—235; 330—38; 333—84, 34